United States Patent Office

2,902,456
Patented Sept. 1, 1959

---

2,902,456

PREPARATION OF CELLULAR POLYESTER-URETHANE RESINS

Eric Gee, Philip Cowey Johnson, Eric Arthur Packer, and Kenneth Stephenson, Manchester, England, assignors to Imperial Chemical Industries Limited, London, England, a corporation of Great Britain No Drawing. Application October 17, 1955
Serial No. 541,018

Claims priority, application Great Britain
October 22, 1954

8 Claims. (Cl. 260—2.5)

This invention relates to improvements in or relating to the manufacture of polymeric materials and more particularly to the manufacture of expanded synthetic rubber-like materials from polyesters and organic polyisocyanates.

The manufacture of expanded synthetic rubber-like materials by reaction of polyesters with polyisocyanates and water in the presence of a catalyst is already known and in particular it has already been proposed to use polyesters of which at least one ingredient is a compound containing more than two isocyanate-reactive groups in the molecule. Such processes are most conveniently carried out when the resultant "sponges" will "cure" rapidly without external heating.

We have now found that the use of polyesters formed from ingredients containing certain proportions of compounds containing more than two isocyanate reactive groups in the molecule leads to the formation of resilient "sponges" which "cure" very rapidly and are exceptionally resistant to hydrolysis.

Thus according to the present invention we provide a process for the manufacture of expanded synthetic rubber-like materials by reacting polyesters with polyisocyanates and water in the presence of a catalyst characterised in that the ingredients used in preparing the polyester comprise from 2 to 18 molar percentage, based on the total dicarboxylic acid incorporated, of at least one compound containing more than two isocyanate-reactive groups. In order to obtain the desired improvements using polyfunctional compounds such as pentaerythritol only between 2 and 8 molar percentage is normally employed, but when using compounds containing fewer isocyanate-reactive groups, for example glycerol or hexanetriol, between 6 and 18 molar percentage is usually incorporated.

Suitable dicarboxylic acids for the preparation of the polyesters include succinic, glutaric, adipic, alkyladipic, pimelic, suberic, β-ethyl-suberic, azelaic, and sebacic acids and aromatic acids such as phthalic, isophthalic, and terephthalic acids. Mixtures of the acids may be used.

Examples of glycols for use in the preparation of the polyesters include ethylene glycol, 1:2-propylene glycol, 1:3-butylene glycol, diethylene glycol, triethylene glycol, tetramethylene glycol, hexamethylene glycol and decamethylene glycol.

The acids and glycols are preferably, for convenience, selected so that the polyester prepared from them is liquid at normal temperature. This may be achieved by the use of at least a proportion of acid or glycol containing one or more lateral alkyl substituents, or with its carbon chain interrupted by one or more ether links.

Suitable compounds containing more than two isocyanate reactive groups include polyhydric alcohols such as glycerol, pentaerythritol, sorbitol, mannitol, hexanetriol, polyallyl alcohol and triethanolamine; polycarboxylic acids such as tricarballylic acid and pyromellitic acid and compounds containing mixed functional groups such as diethanolamine and dihydroxystearic acid.

The polyester is prepared by conventional methods to give a product with an acid value preferably less than 15 mgs. KOH per gm. The degree of polycondensation must be such that the product has such a viscosity that it may be conveniently mixed with the other ingredients but the polymer should not be of such low molecular weight that a wastefully high proportion of polyisocyanate is required to react with it. It is convenient to use a polymer with a viscosity of between 50 and 1000 poises at 25° C.

The polyester thus obtained is mixed with an organic polyisocyanate or mixture of organic polyisocyanates, water, a catalyst and optionally an emulsifying agent. The ingredients may be mixed simultaneously, but it is preferred to use an order of mixing so that the polyester is mixed either with the water or with the diisocyanate separately and then the other of those components is mixed in later. When the mixing of all the components has been completed the fluid mixture is transferred to a suitable mould where "blowing" and "curing" takes place on standing.

Suitable polyisocyanates include hexamethylene diisocyanate, toluylene diisocyanates, diphenylmethane-4:4'-diisocyanate, m- and p-phenylene diisocyanates and monochlorophenyl-2:4-diisocyanate. As catalysts may be used, for example, triethylamine, dimethylcyclohexylamine, di-(β-diethylaminoethyl)adipate, diethylbenzylamine, N-ethylhexamethyleneimine and N-ethylpiperidine.

Suitable emulsifying agents include Turkey-red oil, oleic acid partially neutralised with diethylamine, cetyltrimethylammonium bromide, cetylpyridinium bromide and oleyl sodium sulphate.

Pore size together with the "bulk density" of the products may be varied by increasing or decreasing the amount of water added, and varying the amount of diisocyanate accordingly.

The rate of "blowing" and "curing" of the sponge varies with the amount of catalyst and also with the particular catalyst employed. Similar variations are also obtained by the use of different isocyanates.

Fillers, colouring matters, flame-proofing agents or other materials, preferably not reactive with isocyanates, may be added to the mixture at an appropriate stage.

The invention is illustrated but not limited by the following examples in which parts are by weight.

*Example 1*

50 parts of a diethylene glycol/pentaerythritol adipate copolymer are stirred with 15.7 parts of a 66:33 mixture by weight of toluylene 2:4- and 2:6-diisocyanates, cooling to 10° C. during 10 minutes. A mixture of 1½ parts of di-(β-diethylaminoethyl)-adipate, 1 part of an emulsifying agent (obtained by mixing 286 parts of diethylamine and 1914 parts of oleic acid) and 1 part of water is added and rapidly stirred in during 20 seconds. The still fluid material is poured into a mould and allowed to stand at room temperature. The product is cured in about 14 minutes giving a highly resilient sponge with a density of 0.063 gm. per cc. of foam. The foam loses useful strength and resilience after heating in steam for 72 hours and has a compression set of 31% at 70° C. A sponge prepared similarly from a linear polydiethylene adipate cures in 24 minutes, loses useful strength and resilience after heating in steam for only 17 hours, and has a compression set after 24 hours under 50% compression at 70° C. of 45% and a density of 0.054 gm./cc.

The diethylene glycol/pentaerythritol adipate copolymer used is prepared as follows:

A stream of carbon dioxide is passed through a mixture of 1898 parts of adipic acid, 1521 parts of diethylene glycol, 68 parts of pentaerythritol and 3.5 parts of phosphoric acid, and stirred at 160° C. rising to 230° C. during 2 hours. After stirring at 230° C. for a further 7¼ hours 489 parts of water are collected by distillation and a syrupy product is obtained having an acid value of 1.1 mgs. KOH per gm., a hydroxyl value of 75.7 mgs. KOH per gm. and a viscosity at 25° C. of 122 poises.

Example 2

50 parts of diethylene glycol/pentaerythritol adipate copolymers are stirred with 17.4 parts of a 66:33 mixture by weight of toluylene-2:4- and 2:6-diisocyanates, cooling to 10° C. during 10 minutes. A mixture of 1½ parts of di-($\beta$-diethylaminoethyl)-adipate, 1 part of an emulsifying agent (obtained by mixing 286 parts of diethylamine and 1914 parts of oleic acid) and 1 part of water is added and rapidly stirred in during 20 seconds. The still fluid material is poured into a mould and allowed to stand at room temperature. The product is cured in about 16½ minutes giving a resilient sponge of density 0.055 gm./cc. The foam loses useful strength and resilience after heating in steam for 20 hours. The compression set of the sponge after 24 hours at 70° C. under 50% compression is 45%.

The diethylene glycol/pentaerythritol adipate copolymer used is prepared as follows:

A stream of carbon dioxide is passed through a mixture of 1898 parts of adipic acid, 1516 parts of diethylene glycol, 34 parts of pentaerythritol and 3.4 parts of phosphoric acid stirred at 167° C. rising to 230° C. during 4 hours. After stirring at 230° C. for a further 11½ hours, 448 parts of water are collected by distillation and a syrupy product is obtained having an acid value of 1.1 mgs. KOH per gm., a hydroxyl value of 52.1 mgs. KOH per gm. and a viscosity at 25° C. of 180 poises.

Example 3

50 parts of a diethylene glycol/pentaerythritol adipate copolymer are stirred with 18.6 parts of a 66:33 mixture by weight of toluylene-2:4- and 2:6-diisocyanate, cooling to 10° C. during 10 minutes. A mixture of 1½ parts of di-($\beta$-diethylaminoethyl)adipate, 1 part of a emulsifying agent obtained by mixing 286 parts of diethylamine with 1914 parts of oleic acid) and 1 part of water is added and rapidly stirred in during 20 seconds. The still fluid material is poured into a mould and allowed to stand at room temperature. The product is cured in about 10 minutes giving a resilient sponge of density 0.062 gm./cc. The foam loses useful strength and resilience after heating in steam for 80 hours. The compression set of the sponge at 70° C. is 14.

The polyester used is prepared as follows:

A stream of carbon dioxide is passed through a mixture of 1898 parts of adipic acid, 1527 parts of diethylene glycol, 136 parts of pentaerythritol and 3.4 parts of phosphoric acid, stirred at 170° C. rising to 230° C. during 3⅓ hours. After heating at 230° C. for another 6¾ hours, 440 parts of water are collected by distillation and a syrup is obtained having an acid value of 1.0 mg. KOH per gm., a hydroxyl value of 112.3 mgs. KOH per gm. and a viscosity at 25° C. of 80 poises.

Example 4

50 parts of diethylene glycol/glycerol adipate copolymer are stirred with 14.9 parts of a 66:33 mixture by weight of toluylene-2:4- and 2:6-diisocyanates, cooling to 10° C. during 10 minutes. A mixture of 1½ parts of di-($\beta$-diethylaminoethyl)adipate, 1 part of an emulsifying agent (obtained by mixing 286 parts of diethylamine with 1914 parts of oleic acid) and 1 part of water is added and rapidly stirred in during 20 seconds. The still fluid material is poured into a mould and allowed to stand at room temperature. The product is cured in about 17 minutes giving a resilient sponge of density 0.059 gm./cc. The foam loses useful strength and resilience after heating in steam for 20 hours. The compression set of the sponge at 70° C. is 40%.

The polyester used is prepared as follows:

A stream of carbon dioxide is passed through a mixture of 1898 parts of adipic acid, 1538 parts of diethylene glycol, 31 parts of glycerol and 3.5 parts of phosphoric acid stirred at 154° C. rising to 230° C. during 3 hours. After heating for a further 8½ hours, 450 parts of water are collected by distillation and a syrup is obtained having an acid value of 0.8 mg. KOH per gm., a hydroxyl value of 63.3 mgs. KOH per gm., and a viscosity at 25° C. of 80 poises.

Example 5

50 parts of a diethylene glycol/glycerol adipate copolymer are stirred with 14.9 parts of a 66:33 mixture by weight of toluylene-2:4- and 2:6-diisocyanates, cooling to 10° C. during 10 minutes. A mixture of 1½ parts of di-($\beta$-diethylaminoethyl)adipate, 1 part of an emulsifying agent (obtained by mixing 286 parts of diethylamine with 1914 parts of oleic acid) and 1 part of water is added and rapidly stirred in during 20 seconds. The still fluid material is poured into a mould and allowed to stand at room temperature. The product is cured in about 15 minutes giving a resilient sponge of density 0.055 gm./cc. The foam loses useful strength and resilience after heating in steam for 24 hours. The compression set of the sponge at 70° C. is 40%.

The polyester used in this example is prepared as follows:

A stream of carbon dioxide is passed through a mixture of 1898 parts of adipic acid, 1432 parts of diethylene glycol, 92 parts of glycerol and 3.4 parts of phosphoric acid, stirred at 154° C. rising to 230° C. during 2½ hours. After heating for a further 10 hours at 230° C. 450 parts of water are collected by distillation and a syrup is obtained with an acid value of 0.9 mg. KOH per gm., a hydroxyl value of 64.3 mgs. KOH per gm. and a viscosity at 25° C. of 200 poises.

Example 6

50 parts of diethylene glycol/glycerol adipate copolymer are stirred with 17 parts of a 66:33 mixture by weight of toluylene-2:4- and 2:6-diisocyanates, cooling to 10° C. during 10 minutes. A mixture of 1½ parts of di-($\beta$-diethylaminoethyl)-adipate, 1 part of an emulsifying agent (obtained by mixing 286 parts of diethylamine with 1914 parts of oleic acid) and 1 part of water is added and rapidly stirred in during 20 seconds. The still fluid material is passed into a mould and allowed to stand at room temperature. The product is cured in about 12 minutes giving a resilient sponge of density 0.055 g./cc. The foam loses useful strength and resilience after heating in steam for 80 hours. The compression set of the sponge at 70° C. is 27%.

The polyester used in this example is prepared as follows:

A stream of carbon dioxide is passed through a mixture of 1898 parts of adipic acid, 1363 parts of diethylene glycol, 184 parts of glycerol and 3.5 parts of phosphoric acid stirred at 180° rising to 222° C. during 5 hours. After heating at 225°–235° C. for another 11 hours, 418 parts of water are collected by distillation and a syrup is obtained having an acid value of 1.6 mgs. KOH per gm., a hydroxyl value of 92.0 mgs. KOH per gm. and a viscosity at 25° C. of 165 poises.

Example 7

100 parts of an ethylene glycol/pentaerythritol glutarate copolymer are stirred with 33.6 parts of an approximately 2:1 mixture by weight of toluylene-2:4- and 2:6-diisocyanates at room temperature (25° C.) for 1 minute. A mixture of 3 parts of di-($\beta$-diethylaminoethyl)-adipate, 2 parts of an emulsifying agent (obtained by mixing 286 parts diethylamine and 1914 parts of oleic acid) and 2 parts of water is added and rapidly stirred in during 10 seconds. The still fluid material is poured into a mould and allowed to stand at room temperature. The product is cured in about 9 minutes giving a highly resilient sponge with a density of 0.060 gms./cc. of foam and a compression set of 10% at 70° C.

The ethylene glycol/pentaerythritol glutarate copolymer used is prepared as follows:

A stream of carbon dioxide is passed through a mixture of 2080 parts of dimethyl glutarate, 2418 parts of ethylene glycol, 68 parts of pentaerythritol and 1.4 parts of zinc acetate stirred at 166° C. rising to a maximum of 220° C. After 5½ hours 850 parts of methanol are removed by distillation. The mixture is then heated at 200–220° C. under a pressure of 20 mms. of mercury removing glycol by distillation until a product is obtained having a melt viscosity at 25° C. of 160 poises, an acid value of 0.5 mg. KOH per gm. and a hydroxyl value of 91.7 mg. KOH per gm.

*Example 8*

100 parts of a diethylene glycol/pentaerythritol glutarate copolymer are stirred with 31.2 parts of an approximately 2:1 mixture by weight of toluylene-2:4- and -2:6-diisocyanates at room temperature (25° C.) for 1 minute. A mixture of 3 parts of di-($\beta$-diethylaminoethyl) adipate, 2 parts of an emulsifying agent (an alkylated phenol/ethylene oxide condensate) and 2 parts of water is added and rapidly stirred in during 10 seconds. The still fluid material is poured into a mould and allowed to stand at room temperature. The product is cured in about 9 minutes giving a highly resilient foam with good hydrolytic stability and compression set.

The diethylene glycol/pentaerythritol glutarate copolymer used is prepared as follows:

A stream of carbon dioxide is passed through a mixture of 1716 parts of glutaric acid, 1465 parts of diethylene glycol and 92 parts of pentaerythritol stirred at 168° C. rising to 250° C. during 2¼ hours. After stirring at 250° C. for a further 2½ hours, 480 parts of water are collected by distillation and a product is obtained having an acid value of 1.5 mg. KOH per gm., a hydroxyl value of 73.7 mg. KOH/gm. and a melt viscosity at 25° C. of 206 poises.

*Example 9*

50 parts of a propylene glycol/pentaerythritol adipate copolymer are stirred with 14.4 parts of an approximately 2:1 mixture by weight of toluylene-2:4- and -2:6-diisocyanates cooling to 16° C. during 10 minutes. A mixture of 1.5 parts of di-($\beta$-diethylaminoethyl)adipate, 1 part of an emulsifying agent (obtained by mixing 286 parts of diethylamine and 1914 parts of oleic acid) and 1 part of water is added and rapidly stirred in during 10 seconds. The still fluid material is poured into a mould and allowed to stand at room temperature. The product is cured in about 28 minutes giving a resilient foam with good hydrolytic stability and compression set.

The propylene glycol/pentaerythritol adipate copolymer used is prepared as follow:

A stream of carbon dioxide is passed through a mixture of 196 parts of propylene glycol, 334 parts of adipic acid and 12 parts of pentaerythritol stirred at 141° C. rising to 190° C. during 5¼ hours. After heating at 190° C. for another 10½ hours 79 parts of water are collected by distillation and a product is obtained having an acid value of 2.7 mg. KOH per gm., a hydroxyl value of 65.0 mg. KOH per gm. and a melt viscosity at 25° C. of 273 poises.

*Example 10*

100 parts of a diethylene glycol/hexanetriol adipate copolymer are stirred with 27.6 parts of an approximately 2:1 mixture by weight of toluylene-2:4- and -2:6-diisocyanates at room temperature (25° C.) for 1 minute. A mixture of 3 parts of di-($\beta$-diethylaminoethyl)adipate, 2 parts of an emulsifying agent (obtained by mixing 286 parts of diethylamine with 1914 parts of oleic acid) and 2 parts of water is added and rapidly stirred in for 10 seconds. The still fluid material is poured into a mould and allowed to stand at room temperature. The product is cured in about 9 minutes giving a highly resilient sponge with a density of 0.076 g./cc. of foam and compression set of 24% at 70° C.

The diethylene glycol/hexanetriol adipate copolymer used is prepared as follows:

A stream of carbon dioxide is passed through a mixture of 1898 parts of adipic acid, 1430 parts of diethylene glycol and 184 parts of commercial hexanetriol (72.8% by weight of hexanetriol on basis of hydroxyl content), stirred at 162° C. rising to 250° C. during 3 hours. After heating at 250° C. for another 7 hours, 496 parts of water are collected by distillation and a product is obtained having an acid value of 5.1 mg. KOH per gm., a hydroxyl value of 46.1 mg. KOH per gm. and a melt viscosity at 25° C. of 122 poises.

*Example 11*

100 parts of a diethylene glycol/pentaerythritol adipate copolymer are stirred with 30 parts of an approximately 2:1 mixture by weight of toluylene-2:4- and -2:6-diisocyanates at room temperature (25° C.) for 1 minute. A mixture of 0.5 part of dimethylcyclohexylamine, 0.5 part of an emulsifying agent (an alkylated phenol/ethylene oxide condensate) and 2 parts of water is added and rapidly stirred in during 10 seconds. The still fluid material is poured into a mould and allowed to stand at room temperature. The product is cured in about 17 minutes giving a highly resilient foam with good hydrolytic stability and compression set.

The diethylene glycol/pentaerythritol adipate copolymer used is prepared as follows:

A stream of carbon dioxide is passed through a mixture of 228 parts of adipic acid, 177 parts of diethylene glycol and 8.16 parts of pentaerythritol stirred at 150° C. rising to 250° C. during 3¾ hours. After heating at 250° C. for another 6 hours, 58 parts of water are collected by distillation and a product is obtained having an acid value of 6.0 mg. KOH per gm., a hydroxyl value of 65.1 mg. KOH per gm. and a melt viscosity at 25° C. of 148 poises.

*Example 12*

100 parts of a diethylene glycol/pentaerythritol adipate copolymer are stirred with 31.2 parts of an approximately 2:1 mixture by weight of toluylene-2:4- and -2:6-diisocyanates cooling to 17° C. during 4 minutes. A mixture of 3 parts of $\alpha$-methyl benzyl dimethylamine, 1 part of an emulsifying agent (obtained by mixing 286 parts of diethylamine and 1914 parts of oleic acid) and 2 parts of water is added and rapidly stirred in during 10 seconds. The still fluid material is poured into a mould and allowed to stand at room temperature. The product is cured in about 7 minutes giving a highly resilient sponge with a density of 0.060 g./cc. of foam and a compression set of 21% at 70° C.

The diethylene glycol/pentaerythritol adipate copolymer used is prepared as follows:

A stream of carbon dioxide is passed through a mixture of 227.75 parts of adipic acid, 177 parts of diethylene glycol and 8.16 parts of pentaerythritol, stirred at 150° C. rising to 250° C. during 5½ hours. After heating at 250° C. for another 5 hours, 57 parts of water are collected by distillation and a product is obtained having an acid value of 5.6 mg. KOH per gm., a hydroxyl value of 70.5 mg. KOH per gm. and a melt viscosity at 25° C. of 112 poises.

*Example 13*

100 parts of the diethylene glycol/pentaerythritol adipate copolymer described in Example 12 are stirred with 31.6 parts of an approximately 2:1 mixture by weight of toluylene-2:4- and -2:6-diisocyanates, cooling to 15° during 5 minutes. A mixture of 4 parts of diethylbenzylamine, 1 part of an emulsifying agent obtained by mixing 286 parts of diethylamine and 1914 parts of oleic acid) and 2 parts of water is added and rapidly stirred in during 10 seconds. The still fluid material is poured into a mould and allowed to stand at room temperature. The product is cured in about 8 minutes giving a highly resilient sponge with a density of 0.070 g./cc. of foam and a compression set of 28% at 70° C.

*Example 14*

50 parts of the diethylene glycol pentaerythritol adipate copolymer described in Example 12 are stirred with 15.6 parts of an approximately 2:1 mixture by weight of toluylene-2:4- and -2:6-diisocyanates cooling to 16° C. during 5 minutes. A mixture of 1.5 parts of di-($\beta$-diethylaminoethyl)adipate, 0.75 part of cetyltrimethylammonium bromide and 1 part of water is added and rapidly stirred in during 10 seconds. The still fluid material is poured into a mould and allowed to stand at room temperature. The product is cured in about 15 minutes giving a highly resilient foam which loses useful strength and resilience after heating in steam for 50 hours and has a compression set of 17% at 70° C.

*Example 15*

50 parts of the diethylene glycol pentaerythritol adipate copolymer described in Example 12 are stirred with 15.6 parts of an approximately 2:1 mixture by weight of toluylene-2:4- and -2:6-diisocyanates, cooling to 17° C. during 4 minutes. A mixture of 1.5 parts of di-($\beta$-diethylaminoethyl)adipate, 1.5 parts of an emulsifying agent (a mixed cetyl/oleyl sodium sulphate) and 1 part of water is added and rapidly stirred in during 10 seconds. The still fluid material is poured into a mould and allowed to stand at room temperature. The product is cured in about 11 minutes giving a highly resilient foam with a compression set of 11% at 70° C.

*Example 16*

100 parts of the diethylene glycol/pentaerythritol adipate copolymer described in Example 12 are stirred with 31.2 parts of an approximately 2:1 mixture by weight of toluylene-2:4- and -2:6-diisocyanates, cooling to 10° C. during 12 minutes. A mixture of 3 parts of di-($\beta$-diethylaminoethyl)adipate, 2 parts of an emulsifying agent (obtained by mixing 286 parts of diethylamine and 1914 parts of oleic acid) and 2 parts of water is added and rapidly stirred in during 10 seconds. The still fluid material is poured into a mould and allowed to stand at room temperature. Foaming is complete after 3 minutes and the product is cured in about 16 minutes giving a highly resilient sponge with a density of 0.070 g./cc. of foam and a compression set of 24% at 70° C.

An identical foam prepared at 40° C. gives a highly resilient product in which foaming is complete in 80 seconds and which is cured in about 14 minutes. The sponge has a density of 0.083 g./cc. of foam and a compression set of 16% at 70° C.

*Example 17*

50 parts of a diethylene glycol/pentaerythritol adipate copolymer are stirred with a mixture of 1.5 parts of di-($\beta$-diethylaminoethyl)adipate, 1 part of an emulsifying agent obtained by mixing 286 parts of diethylamine and 1914 parts of oleic acid) and 1 part of water, cooling to 13° C. during 5 minutes. 15.6 parts of an approximately 2:1 mixture by weight of toluylene-2:4- and -2:6-diisocyanates are added and rapidly stirred in during 10 seconds. The still fluid material is poured into a mould and allowed to stand at room temperature. The product is cured in about 16 minutes giving a highly resilient sponge with a density of 0.060 g./cc. of foam and a compression set of 30% at 70° C.

The diethylene glycol/pentaerythritol adipate copolymer used is prepared as follows:

A stream of carbon dioxide is passed through a mixture of 1898 parts of adipic acid, 1475 parts of diethylene glycol and 68 parts of pentaerythritol stirred at 140° C. rising to 250° C. during 3½ hours. After heating at 250° C. for another 7½ hours, 436 parts of water are collected by distillation and a product is obtained having an acid value of 2.6 mg. KOH per gm., a hydroxyl value of 67.6 mg. KOH per gm. and a melt viscosity at 25° C. of 116 poises.

*Example 18*

100 parts of the diethylene glycol/pentaerythritol adipate copolymer described in Example 11 is stirred with 8 parts of trichloroethyl phosphate and 30 parts of an approximately 2:1 mixture by weight of toluylene-2:4- and -2:6-diisocyanates at room temperature (25° C.) for 1 minute. A mixture of 3 parts of di-($\beta$-diethylaminoethyl)adipate, 2 parts of an emulsifying agent (obtained by mixing 286 parts of diethylamine and 1914 parts of oleic acid) and 2 parts of water is added and rapidly stirred in during 10 seconds. The still fluid material is poured into a mould and allowed to stand at room temperature. The product is cured in about 16 minutes giving a highly resilient sponge of improved flame resistance, with a density of 0.075 g./cc. of foam and a compression set 12% at 70° C.

*Example 19*

100 parts of a diethylene glycol/pentaerythritol adipate copolymer are stirred with 39.6 parts of an approximately 2:1 mixture by weight of toluylene-2:4- and -2:6-diisocyanates and with 1 part of a silicone/castor oil mixture (obtained by mixing 1 part of a chain stopped dimethyl polyorganosiloxane fluid of viscosity 1000 centistokes at 38° C. and 1000 parts of castor oil) at room temperature (25° C.) for 1 minute. A mixture of 3 parts of di-($\beta$-diethylaminoethyl)adipate, 2 parts of an emulsifying agent (obtained by mixing 286 parts of diethylamine and 1914 parts of oleic acid) and 3 parts of water is added and rapidly stirred in during 10 seconds. The still fluid material is poured into a mould and allowed to stand at room temperature. The product is cured in about 16 minutes giving a highly resilient, coarse-pored (1–3 mms.) sponge with a density of 0.047 g./cc. of foam.

The diethylene glycol/pentaerythritol adipate copolymer used is prepared as follows:

A stream of carbon dioxide is passed through a mixture of 228 parts of adipic acid, 177 parts of diethylene glycol and 8.16 parts of pentaerythritol stirred at 143° C. rising to 250° C. during 5¼ hours. After heating for another 11 hours at 250° C., 58½ parts of water are collected by distillation and a product is obtained having an acid value of 2.7 mg. KOH per gm., a hydroxyl value of 68.0 mg. KOH per gm. and a melt viscosity at 25° C. of 142 poises.

*Example 20*

50 parts of a diethylene glycol/pentaerythritol adipate copolymer are stirred with 6.5 parts of acetone and 16.8 parts of an approximately 2:1 mixture by weight of toluylene-2:4- and -2:6-diisocyanates, cooling to 15° C. during 5 minutes. A mixture of 1.5 parts of di-($\beta$-diethylaminoethyl)adipate, 1 part of an emulsifying agent (obtained by mixing 286 parts of diethylamine and 1914 parts of oleic acid) and 1 part of water is added and rapidly stirred in during 10 seconds. The still fluid material is poured into a mould and allowed to stand at room temperature. The product is cured in about 7 minutes giving a highly resilient sponge with a density of 0.042 g./cc. of foam and a compression set of 10% at 70° C.

The diethylene glycol/pentaerythritol adipate used is prepared as follows:

A stream of carbon dioxide is passed through a mixture of 1898 parts of adipic acid, 1527 parts of diethylene glycol, 136 parts of pentaerythritol and 3.4 parts of phosphoric acid, stirred at 170° C. rising to 230° C. during 3⅓ hours. The material is heated at 230° C. for another 6¾ hours, 440 parts of water being collected by distillation, and finally a proportion of glycol is removed by distillation, heating for 1½ hours at 203°–214° C. under a pressure of 0.2 mm. of mercury. The product has an acid value of 0.8 mg. KOH per gm., a hydroxyl value of 77.6 mg. KOH per gm., and a melt viscosity at 25° C. of about 1000 poises.

*Example 21*

100 parts of diethylene glycol/pentaerythritol adipate copolymer described in Example 11 containing 0.0012 part of a silicone (a chain stopped dimethyl polyorganosiloxane of viscosity 100 centistokes at 38° C. containing 5% silica dispersed therein) are stirred with 30 parts of an approximately 2:1 mixture by weight of toluylene-2:4- and -2:6-diisocyanates at room temperature (25° C.) for 1 minute. A mixture of 1 part of dimethylcyclohexylamine, 1 part of an emulsifying agent (obtained by mixing 286 parts of diethylamine and 1914 parts of oleic acid) and 2 parts of water is added and rapidly stirred in during 10 seconds. The still fluid material is poured into a mould and allowed to stand at room temperature. The product is cured in about 8 minutes giving a highly resilient sponge with a density of 0.060 g./cc. of foam and a compression set of 5% at 70° C.

What we claim is:

1. A process for the manufacture of expanded synthetic rubber-like materials which comprises reacting a polyester having an acid value less than 15 mgs. KOH per gm. and a hydroxyl number from 46.1 to 112.3 mgs. KOH per gm. and a viscosity between 50 and 1000 poises at 25° C. and further characterized in that from 2 to 18 molar percent, based on the total dicarboxylic acid content of the ester ingredients, are selected from the group consisting of an aliphatic polyhydroxy alcohol having more than 2 hydroxyl groups, tricarballylic acid, pyromellitic acid, diethanolamine, and dihydroxystearic acid, said dicarboxylic acid consisting essentially of an aliphatic dicarboxylic acid having from 2 to 8 carbon atoms in the chain between the carboxyl groups, with an organic diisocyanate and water in the presence of a catalyst comprising a member selected from the group consisting of triethylamine, dimethylcyclohexylamine, di-(β-diethylaminoethyl)adipate, diethylbenzylamine, N-ethylhexamethyleneimine, N-ethylpiperidine, and α-methylbenzyldimethylamine, wherein said diisocyanate is present in an amount substantially equivalent to the reactive end-groups of the said polyester and the water present, to form a polyurethane.

2. The process of claim 1, wherein said polyester is liquid at room temperature.

3. The process of claim 1, wherein said polyester is first mixed with said water and said diisocyanate is subsequently added to said mixture.

4. The process of claim 1, wherein said polyester is first mixed with said diisocyanate and said water is subsequently added to said mixture.

5. The process for the manufacture of expanded synthetic rubber-like materials which comprises reacting a polyester having an acid value less than 15 mgs. KOH per gm. and a hydroxyl number of from 46.1 to 112.3 mgs. KOH per gm. and a viscosity between 50 and 1000 poises at 25° C. and further characterized in that from 2 to 18 molar percent, based on the total dicarboxylic acid content of the ester ingredients, consist essentially of a polyhydroxy alcohol having more than 2 hydroxyl groups, said dicarboxylic acid consisting essentially of an aliphatic dicarboxylic acid having from 2 to 8 carbon atoms in the chain between the carboxylic groups, with an organic diisocyanate and water in the presence of a catalyst comprising a member selected from the group consisting of triethylamine, dimethylcyclohexylamine, di-(β-diethylaminoethyl)adipate, diethylbenzylamine, N-ethylhexamethyleneimine, N-ethylpiperidine, and α-methylbenzyldimethylamine, wherein said diisocyanate is present in an amount substantially equivalent to the reactive end-groups of the said polyester and the water present to form a polyurethane.

6. A process for the manufacture of expanded synthetic rubber-like materials which comprises reacting a polyester having an acid value less than 15 mgs. KOH per gm. and a hydroxyl number of from 46.1 to 112.3 mgs. KOH per gm. and a viscosity between 50 and 1000 poises at 25° C. and further characterized in that from 2 to 18 molar percent, based on the total dicarboxylic acid content of the ester ingredients, consist essentially of a tricarballylic acid, said dicarboxylic acid consisting essentially of an aliphatic dicarboxylic acid having from 2 to 8 carbon atoms in the chain between the carboxyl groups with an organic diisocyanate and water in the presence of a catalyst comprising a member selected from the group consisting of triethylamine, dimethylcyclohexylamine, di-(β-diethylaminoethyl)adipate, diethylbenzylamine, N-ethylhexamethyleneimine, N-ethylpiperidine, and α-methylbenzyldimethylamine, wherein said diisocyanate is present in an amount substantially equivalent to the reactive end-groups of the said polyester and the water present, to form a polyurethane.

7. A process for the manufacture of expanded synthetic rubber-like materials which comprises reacting a polyester having an acid value less than 15 mgs. KOH per gm. and a hydroxyl number of from 46.1 to 112.3 mgs. KOH per gm. and a viscosity between 50 and 1000 poises at 25° C. and further characterized in that from 2 to 18 molar percent, based on the total dicarboxylic acid content of the ester ingredients, consist essentially of diethanol amine, said dicarboxylic acid consisting essentially of an aliphatic dicarboxylic acid having from 2 to 8 carbon atoms in the chain between the carboxyl groups, with an organic diisocyanate and water in the presence of a catalyst comprising a member selected from the group consisting of triethylamine, dimethylcyclohexylamine, di-(β-diethylaminoethyl)adipate, diethylbenzylamine, N-ethylhexamethyleneimine, N-ethylpiperidine, and α-methylbenzyldimethylamine, wherein said diisocyanate is present in an amount substantially equivalent to the reactive end-groups of the said polyester and the water present, to form a polyurethane.

8. A process for the manufacture of expanded synthetic rubber-like materials which comprises reacting a polyester having an acid value less than 15 mgs. KOH per gm. and a hydroxyl number of from 46.1 to 112.3 mgs. KOH per gm. and a viscosity between 50 and 1000 poises at 25° C and further characterized in that from 2 to 18 molar percent, based on the total dicarboxylic acid content of the ester ingredients, consist essentially of dihydroxy stearic acid, said dicarboxylic acid consisting essentially of an aliphatic dicarboxylic acid having from 2 to 8 carbon atoms in the chain between the carboxyl groups, with an organic diisocyanate and water in the presence of a catalyst comprising a member selected from the group consisting of triethylamine, dimethylcyclohexylamine, di-(β-diethylaminoethyl)adipate, diethylbenzylamine, N-ethylhexamethyleneimine, N-ethylpiperidine, and α-methylbenzyldimethylamine, wherein said diisocyanate is present in an amount substantially equivalent to the reactive end-groups of the said polyester and the water present, to form a polyurethane.

References Cited in the file of this patent

UNITED STATES PATENTS

| | | |
|---|---|---|
| 2,770,241 | Winkler | Nov. 13, 1956 |
| 2,788,332 | Muller et al. | Apr. 9, 1957 |